United States Patent [19]

Stone et al.

[11] Patent Number: 5,016,193

[45] Date of Patent: May 14, 1991

[54] PIXEL AND LINE ENHANCEMENT METHOD AND APPARATUS

[75] Inventors: Robert F. Stone, New Smyrna; Jeffrey D. Potter, Port Orange; William S. Beamon, III, Ormond Beach, all of Fla.

[73] Assignee: General Electric Company, Syracuse, N.Y.

[21] Appl. No.: 178,934

[22] Filed: Apr. 7, 1988

[51] Int. Cl.[5] .......... G06F 15/68

[52] U.S. Cl. .......... 364/518; 340/731; 358/451

[58] Field of Search .......... 364/521, 518; 340/728, 340/731, 735, 799; 358/280, 445, 451

[56] References Cited

U.S. PATENT DOCUMENTS

| | | | |
|---|---|---|---|
| 4,090,188 | 5/1978 | Suga | 340/731 |
| 4,571,635 | 2/1986 | Mahoodi et al. | 358/284 |
| 4,573,068 | 2/1986 | Dorsey et al. | 358/11 |
| 4,703,439 | 10/1987 | Lotz | 364/521 |
| 4,749,990 | 6/1988 | Birkner | 340/799 |
| 4,774,569 | 9/1988 | Morton et al. | 358/280 X |
| 4,866,520 | 9/1989 | Nomura et al. | 340/728 X |

OTHER PUBLICATIONS

"The Picture Clears for Digital TV", by Leland Teschler, Machine Design, Sep. 11, 1986, pp. 90–95.

"Raising the Quality of NTSC", by James L. Rieger, Kitchen Productions, Inc., Oct. 25, 1986, Digital Design, pp. 52–54.

*Primary Examiner*—Dale M. Shaw
*Assistant Examiner*—Mark K. Zimmerman
*Attorney, Agent, or Firm*—Paul Checkovich; Stephen A. Young

[57] ABSTRACT

In computer image generation (CIG) systems, image data for defining pixel modulation values and for supporting a display having a predetermined resolution are determined for defining a scene. For some applications, such as for representing background and/or peripheral areas, it may be acceptable to use data having a lower resolution than the predetermined resolution. Method and apparatus for taking a portion of the image data obtain derived data by a predetermined combination of the portion of image data. Lines of composed data supplied to a display device include a sequence of pixel modulation values selected from the portion of image data and the derived data. In one embodiment the number of lines supported by the image data is doubled with each line containing 50% image data and 50% derived data. Pixel modulation values may be oversampled between adjacent lines of the display for obtaining derived data. Respective composed data for a plurality of display devices may be obtained from a respective plurality of portions of the image data, thus obviating the need to provide additional video processing channels along with associated hardware.

23 Claims, 3 Drawing Sheets

PIXEL AND LINE ENHANCEMENT METHOD AND APPARATUS

BACKGROUND OF THE INVENTION

This invention relates to computer image generation (CIG), and, more particularly, to apparatus and methods for generating display data for a desired image presentation on a plurality of display devices, wherein the display data for each device is derived from a portion of conventional source data for a single display.

CIG may be employed to provide simulated visual representations useful for training, such as for an airplane pilot or tank driver, without having to operate the actual vehicle. In certain applications, an adequate overall visual image may be presented by a combination of a full high resolution display disposed about the line of sight of an observer with lower resolution images at the periphery, on the side or as background. Use of lower resolution displays, like those based on 525 line television standards (typically two interlaced fields of 262.5 lines each), generally produce a distracting raster prominence when displayed over an expanded area.

In a real time computer image generation system (see for example U.S. Pat. No. 4,727,365 to Bunker et al which is assigned to the instant assignee) display data for at least one and typically two full high resolution channels are generated. The term "full resolution" as used herein refers to having corresponding pixel modulation values for each pixel of a line and for all lines of the display. One presently employed high resolution display features 1,023 lines by 1,000 pixels per line per frame, conventionally referred to as a "1K by 1K" display. It should be understood that the present invention is applicable to any display regardless of the actual number of lines and actual number of pixels per line of the display.

For a typical CIG system, image generation can be regarded as occurring in sequentially coupled processing stages, conventionally designated as a controller, a geometry processor and a display processor. Very briefly, the controller receives inputs that indicate an operator's position and orientation; the geometry processor obtains scene descriptors from a data base and rotates and clips the resulting images in response to inputs from the controller: and, the display processor determines for the image to be displayed a color modulation value for each pixel of the display device to be used. A more detailed description of the operation of a computer image generator may be had by reference to the above-identified Bunker et al patent.

A typical display frame is formed from two interlaced fields that are raster scanned, such as in the U.S. television standard wherein a new field is supplied each 1/60 of a second so that a new frame is presented each 1/30 of a second. Determining the appropriate full pixel modulation values for a plurality of 1K by 1K display devices places a tremendous computing burden on the display processor, such that one display processor will typically supply image information for only one or two 1K by 1K display devices.

In certain applications, it may be desirable to have more than two displays. Since a full high resolution display may be only required around the line of sight, it would be desirable to take the image data generated for one 1K by 1K display device and apportion it among a plurality of 1K by 1K display devices while achieving adequate image quality for each of the plurality of display devices. Although some fine detail and overall resolution may be expected to be lost by such distribution of the image data, the resulting image displays, which may be used for background and/or off line-of-sight, or peripheral representations, may be considered acceptable. Further, the display processor is hardware intensive and appropriately distributing the image data among a plurality of displays could save the expense of having to replicate additional display processors to provide full high resolution image data to each of the plurality of displays.

In order to avoid the expense associated with adding hardware, including memory and processing apparatus, for generating display data for full high resolution, it would be desirable to use a respective portion of the full high resolution data available from a currently employed display processor to generate pixel modulation data for controlling displays on a respective plurality of high resolution devices, while avoiding raster prominence and achieving acceptable resolution.

Accordingly, it is an object of the present invention to provide a display system for a computer image generation system, wherein the CIG system produces data for one display system having a predetermined resolution and further wherein a pixel modulation manipulation system produces data for a plurality of displays having the predetermined resolution from the data for the one display.

Another object is to provide a method for deriving data for a high resolution display from a predetermined portion of data for a full high resolution display.

Still another object is to provide a method for deriving data for a plurality of high resolution displays from data for one full high resolution display.

Yet another object is to provide a method for deriving data for a plurality of displays having a predetermined resolution from data for one display having the predetermined resolution.

SUMMARY OF THE INVENTION

In accordance with the present invention, original pixel modulation, or image, data, which are typically used to supply a single display, are partitioned and each respective resulting sub-division of the original data is used for forming composed pixel modulation data for supplying a respective display. The number of lines and pixels per line of each respective display may be the same as the single display.

Processing for expanding the original data of each sub-division increases the number of lines and/or pixels per line of the composed data over the original data of each sub-division. In one aspect of the present invention, predetermined pixel modulation values from adjacent lines of the original data of a sub-division are combined, such as by averaging, for providing derived pixel modulation values. The derived pixel modulation values along with original pixel modulation data from the sub-division are arranged, such as by alternating derived and original pixel modulation data along a line, to form the composed pixel modulation data. The derived and original pixel modulation data are staggered between adjacent lines so that a checkerboard type pattern is developed. In this case each line of composed data includes 50% original and 50% derived pixel modulation data.

Advantages achieved by the present invention include the ability to provide a plurality of image displays from an original source of pixel modulation data that conventionally was used to supply only a single display. Further, by combining pixel modulation data from different lines of the original modulation data, the system of the present invention is able to synthesize representative pixel modulation information that was lost in the initial allocation of pixel modulation values for the original pixel modulation data during the transformation from three-dimensional to two-dimensional image descriptors performed by the CIG system. In addition, more useful or perceived video may be provided, eliminating the need for certain additional hardware for the CIG system or even possibly for an additional CIG, or at least an image generator system. Also, when arranged in the checkerboard pattern, in accordance with the present invention, real or actual pixel modulation data (i.e. that obtained from the three dimensional image descriptors) is at least as close as the adjacent pixel.

In another aspect of the present invention, pixel and line enhancement technique (PALET) circuitry includes a combiner circuit and a selector circuit. The combiner circuitry predeterminedly combines, such as by averaging, individual corresponding pixel modulation values from adjacent lines of original pixel modulation data for forming derived pixel modulation data, and the selector circuitry selects pixel modulation values from a previous line or present line of original pixel modulation data or from the derived pixel modulation data for forming composed pixel modulation data. The previous and present lines may be adjacent lines of the same field of a display when an interlaced display is used or may be adjacent lines of a frame when a non-interlaced display is desired. Oversampling between adjacent lines of the same field or frame and/or between adjacent pixels of a line may be provided for minimizing undesirable artifacts.

The output of the selector circuitry includes the composed pixel modulation data. Signals representative of the value of the composed pixel modulation data are ultimately provided to displays.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
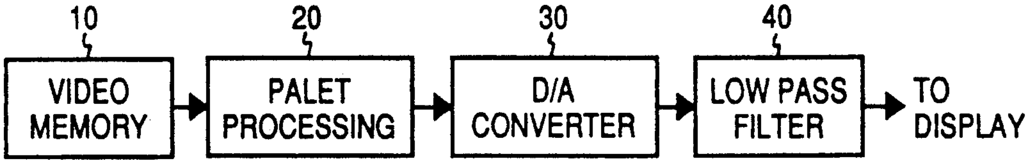
FIG. 1 is a block diagram of image data processing circuitry in accordance with the present invention.

Referring to FIG. 1, a block diagram of image data processing circuitry in accordance with the present invention is shown. Video memory 10 stores the image information, or pixel modulation data, available from a display processor (not shown), for each field of a frame of a full resolution display. For example, the portion of memory 10 that may be devoted to pixel modulation data for a 1K by 1K display is nominally one megaword (1M) of memory for a frame. The following discussion is directed to one field of a frame, (or to the entire frame if field interlacing is not used) it being understood that the other field may be processed analogously. Conventionally, one field is designated as the odd field which includes the odd numbered lines of the displayed frame and the other field is designated as the even field and includes the even numbered lines of the displayed frame.

However, the present invention is not limited to use with interlaced fields. It may also be employed to produce composed pixel modulation data for a frame, wherein the lines of the frame are displayed in sequential order in a non-interlaced pattern.

Pixel modulation data is provided one line at a time (bits in parallel and word, or pixel, serially) to an input of pixel and line enhancement technique (PALET) processing circuitry. 20. That is, each pixel modulation value is generally represented by a plurality of bits with the plurality of bits for each pixel arranged to occur in a sequential order. PALET circuitry 20 manipulates and predeterminedly combines pixel data from adjacent lines of a field and selectively supplies original or combined pixel modulation data as a composed data signal to an input of a digital-to-analog (D/A) converter 30. "Original" or "normal" pixel modulation data as used herein refers to pixel modulation data that is available from the video memory (typically a part of a display processor) without modification, while "combined" or "derived" pixel modulation data refers to pixel modulation data that has been processed by and is available from PALET or other pixel modulation manipulation circuitry in accordance with the present invention. D/A converter 30 accepts the composed pixel modulation data in digital format from PALET circuitry 20 and provides an analog signal representative of the value of the digital pixel data supplied thereto to an input of a low-pass filter 40. Low-pass filter 40 attenuates undesirable high frequencies that may be present as a result of data manipulation in PALET circuitry 20. Low-pass filter 40 is not necessary if an acceptable displayed image can be produced without it. Timing signals for coordinating data transfers among video memory 10, PALET processing circuitry 20, D/A converter 30 and low-pass filter 40 (if used) are available from synchronizing circuitry (not shown) as is known in the art.

The circuitry shown in FIG. 1 is sufficient for a monochrome display. For a full color display, separate red, green and blue processing paths are used. Each processing path includes a PALET processing circuit, having an input connected to one of a red, green and blue output of video memory 10, a D/A converter and a low-pass filter respectively analogous to PALET circuitry 20, D/A converter 30 and low-pass filter 40. The red, green and blue outputs from the low-pass filters are connected to the display device.

Figure 2A:
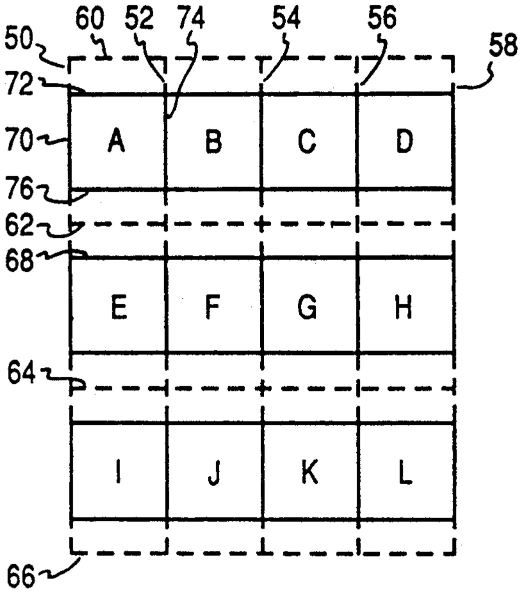
FIG. 2A is a representative sample of video descriptors showing three lines having four pixels per line.

Referring to FIG. 2A, a representative sample of video descriptors with three lines having four pixels per line is shown. The first line has pixels and corresponding modulation values designated A, B, C and D, the second line has pixels and corresponding modulation values designated E, F, G and H and the third line has pixels and corresponding modulation values designated I, J, K and L. The lines including pixels A-L are adjacent lines of the same field that are spaced apart vertically. Another group of lines (not shown) are disposed or interlaced by a raster scan between the lines having pixels A-L for defining the other field of the frame.

Pixel A, which is typically square or rectangular, is bounded by solid lines 70, 72, 74 and 76. In order to avoid undesirable artifacts in the ultimate display when the lines of pixels are from one field of an interlaced display, data for determining the modulation value assigned to pixel A may be spatially oversampled in the horizontal and/or vertical direction. Vertical oversampling is indicated in FIG. 2A. Vertical oversampling provides data which are contiguous and therefore have no spatial gaps in the vertical direction. Horizontal oversampling may be analogously performed.

For vertical oversampling, modulation data for pixel A is derived from the area bounded by broken lines 50 and 52, which coincide with lines 70 and 74, respectively, and by broken lines 60 and 62. Line 60 divides the pixel area directly above pixel A in half so that modulation information from the bottom half of the pixel area directly above pixel A is included for determining the modulation value of pixel A. Likewise, line 62 divides the pixel area directly below pixel A in half so that modulation information from the top half of the pixel area directly below pixel A is included for determining the modulation value of pixel A. Of course, modulation information from the area within lines 70, 72, 74 and 76 is also included for determining the modulation value of pixel A. The remaining pixels B-L may be analogously vertically over sampled using appropriate boundary lines 50, 52, 54, 56, 60, 62, 64 and 66.

A representative pixel of the other field from the one illustrated in FIG. 2A, may be bounded by lines 50, 52, 68 and 76. Vertical oversampling for this representative pixel would include information from the bottom half of the area of pixel A and the top half of the area of pixel E. Oversampling modulation values for less than a whole pixel may be conveniently determined by dividing each pixel into an appropriate number of sub-pixels.

Figure 2B:
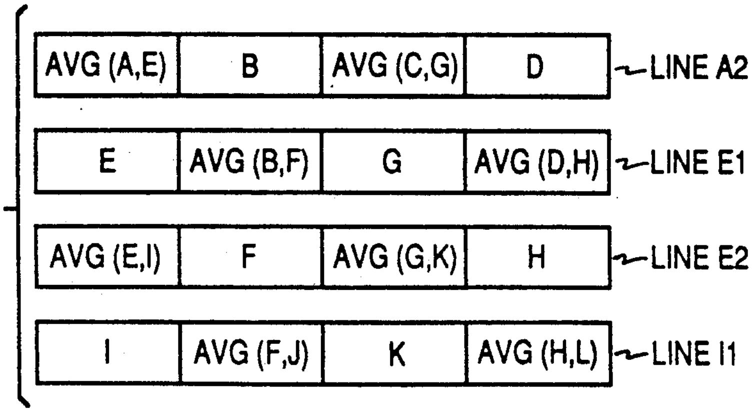
FIG. 2B shows a pattern for increasing the number of lines from a predetermined set of data in accordance with the present invention.

Referring to FIG. 2B, a pattern for increasing the number of lines for one field from a predetermined set of data for the field in accordance with the present invention is shown. Each line of FIG. 2A provides pixel modulation data for two lines of FIG. 2B. For example, line E1 is derived from the present line including pixels E, F, G and H, and the previous line including pixels A, B, C and D of FIG. 2A. The first pixel modulation value of line E1 is the modulation value of pixel E, the next pixel modulation value is the average value of the pixel modulation values for vertically corresponding pixels B and F, the next pixel modulation value is the modulation value of pixel G, and the next pixel modulation value is the average value of the pixel modulation values for vertically corresponding pixels D and H.

Continuing with the example, line E2 is derived from the present line including pixels I, J, K and L and the previous line including pixels E, F, G and H of FIG. 2A. The first pixel modulation value of line E2 is the average value of the pixel modulation values for vertically corresponding pixels E and I, the next pixel modulation value is the modulation value of pixel F, the next pixel modulation value is the average value of the pixel modulation values for vertically corresponding pixels G and H, and the next pixel modulation value is the modulation value of pixel H. Further, line I1 is derived from the present line including pixels I, J, K and L, and the previous line including pixels E, F, G and H. The first pixel modulation value of line I1 is the modulation value of pixel I, the next pixel modulation value is the average value of the modulation values of vertically corresponding pixels F and J, the next pixel modulation value is the modulation value of pixel K, and the next pixel modulation value is the average value of the modulation values of vertically corresponding pixels H and L. Likewise, line A2 is derived from the present line including pixels E, F, G and H, and the previous line including pixels A, B, C and D. The first pixel modulation value of line A2 is the average value of the modulation values of vertically corresponding pixels A and E, the next pixel modulation value is the modulation value of pixel B, the next pixel modulation value is the average value of the modulation values of vertically corresponding pixels C and G, and the next pixel modulation value is the modulation value of pixel D.

Thus, using the checkerboard scheme shown in FIG. 2B, the number of lines of composed pixel modulation data is double the number of lines of pixel modulation data, such as shown in FIG. 2A, from which they are derived. Each line of composed pixel modulation data of FIG. 2B includes 50% original pixel modulation values and 50% derived, or combined, pixel modulation values. It is noted that each line of composed pixel modulation data includes at least one pixel modulation value selected from the derived pixel modulation data and from the original pixel modulation values.

Using line E1 as exemplary, for a first group of alternate lines of the derived pixel data, the pixel progression along the line includes an original pixel modulation value (e.g. pixel E) followed by the next original pixel modulation value (e.g. pixel F) predeterminedly combined with the corresponding pixel modulation value (e.g. pixel B and averaged) disposed above it in the previous line, followed by the next original pixel value (e.g. pixel G), followed by the next original pixel value (e.g. pixel D) predeterminedly combined with the corresponding pixel modulation value (e.g. pixel H and averaged) disposed below it in the next line. For a second group of alternate lines interspersed between the first group of alternate lines of the same field, an exemplary member of the second group being line E2, a line includes an original pixel modulation value (e.g. pixel E) predeterminedly combined with the corresponding pixel modulation value (e.g. pixel I and averaged) disposed below it in the next line, followed by the next original pixel value (e.g. pixel F), followed by the next original pixel modulation value (e.g. pixel G) predeterminedly combined with the corresponding pixel modulation value (e.g. pixel K and averaged) disposed below it in the next line, followed by the next original pixel value (e.g. pixel H). Thus each line of composed pixel modulation data of FIG. 2B includes an original pixel modulation value alternating with derived pixel modulation values along the line. The pattern as shown in FIG. 2B may be extended for additional lines and additional pixel modulation values along a line as desired.

Figure 3:
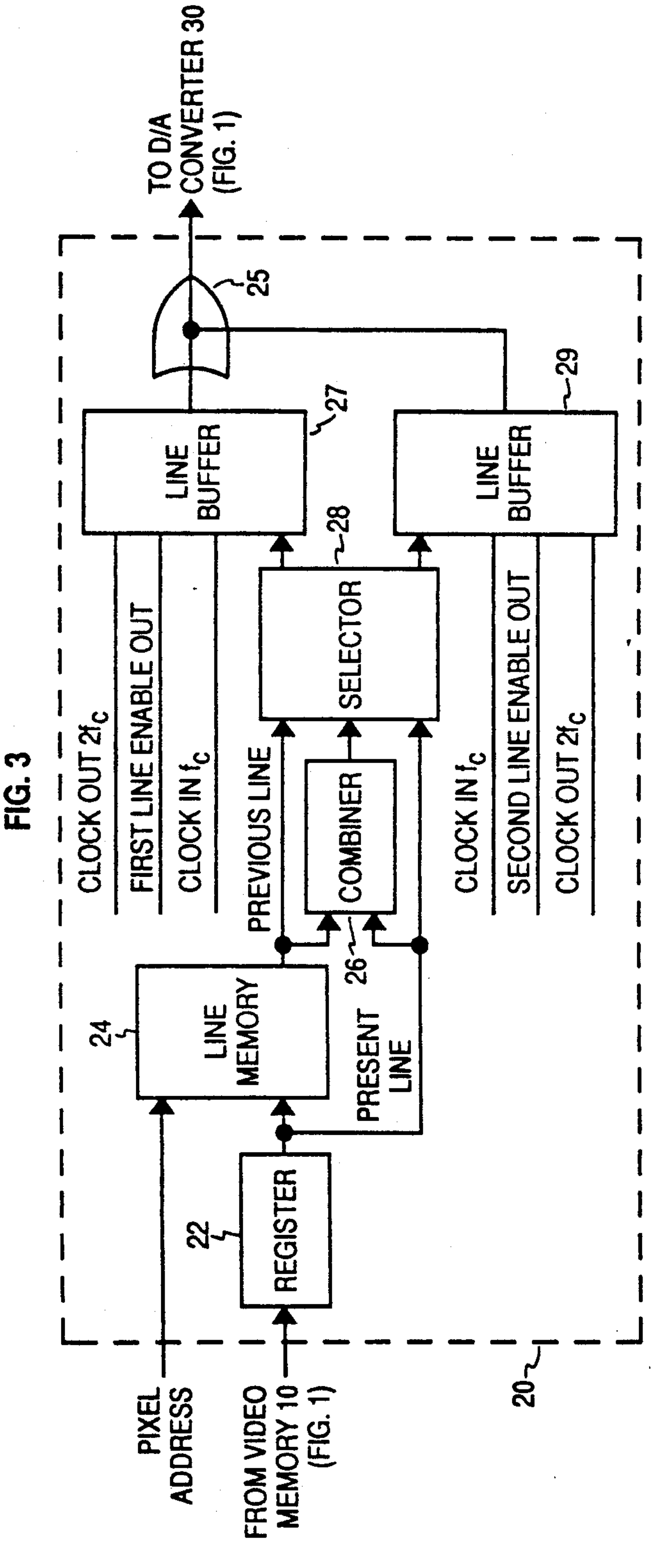
FIG. 3 is a block diagram of the PALET processing circuitry of FIG. 1 useful for obtaining the pattern of FIG. 2B.

Referring to FIG. 3, a block diagram of PALET processing circuitry 20 is shown. PALET processing circuitry 20 includes a buffer register 22, a line memory 24, a combiner 26, a selector 28, line buffers 27 and 29 and switching means 25, such as may include a tri-state device. The output of register 22 is connected to an input of line memory means 24, combiner 26 and selector 28. An output of line memory 24 is connected to another input of combiner 26 and to another input of selector 28. An output of combiner 26 is connected to a third input of selector 28. Outputs of selector 28 are respectively connected to an input of line buffers 27 and 29. Line buffers 27 and 29 may each comprise a first-in first-out (FIFO) line buffer. Outputs from line buffers 27 and 29 are connected to respective inputs of tri-state device 25 whose output constitutes the output of PALET circuitry 20 and is connected to an input of D/A converter 30 (FIG. 1).

The pixel modulation data representing lines of one field of video from video memory 10 are supplied to an input of buffer register 22, constituting the input of PALET circuitry 20. The pixel modulation data available at the output of register 22 are designated present line pixel modulation data. The present line pixel modulation data from register 22 are also supplied to line memory 24 where they are stored for one line processing period. The output of line memory 24 has available pixel modulation data designated previous line pixel modulation data. Previous line pixel modulation data are equivalent to the present line pixel modulation data delayed by one line processing period. The delay through memory 24 and timing of the previous line pixel modulation data output from memory 24 are controlled by synchronization signals (not shown) and pixel address information supplied to line memory 24, as is known in the art, so that individual pixel modulation data arriving at the inputs of combiner 26 are appropriately correspondent (vertically in a typical horizontally swept display) and time coincident for processing to obtain the desired combined pixel modulation data that is available at the output of combiner 26.

Thus, the mth pixel from the beginning of the previous line pixel modulation data and the corresponding nth pixel from the beginning of the present line pixel modulation data, wherein m and n are equal, will arrive generally at the same time at the inputs of combiner circuit 26. Combiner 26 may include a circuit which simultaneously accepts a pixel modulation value from the previous line pixel modulation data and the corresponding pixel modulation value from the present line pixel modulation data and determines the average value of the accepted pixel modulation values, which average value may be ultimately supplied to selector 28 from combiner 26 as the combined pixel modulation data. Other pixel modulation value combinations, such as weighted averaging, may be used if desired.

Selector 28 selects the value of one of the three pixel modulation signals available at its inputs for transfer to its output. Thus, the output of selector 28 has available a pixel modulation value from the previous line of pixel modulation data, or a pixel modulation value from the present line of pixel modulation data, or a combined pixel modulation value. The actual signal available at the output of selector 28 at any instant is controlled by synchronizing and timing circuitry (not shown).

The signal available from one output of selector 28, representing pixel modulation values for one line of the display, is supplied to an input of line buffer 27. The signal available from another output of selector 28, representing pixel modulation values for the next line of the display, is provided to an input of line buffer 29. Line buffers 27 and 29 are able to store one complete line of pixel modulation values. The pixel modulation values for the following line of the display are supplied to line buffer 27 so that succeeding lines of pixel modulation values from selector 28 are alternately provided to line buffer 27 and line buffer 29.

The output signals from line buffers 27 and 29 are supplied to respective inputs of switching means 25. Switching means 25 transfers the pixel modulation values available at its inputs to its output, which constitutes the output of PALET circuitry 20. The signal available at the output of switching means 25 has available the original and combined pixel modulation data which is designated the composed pixel modulation data.

In operation, line buffer 27 and line buffer 29 each receive a clock-in signal at frequency $F_c$ and a clock-out signal at frequency 2 $f_c$. The frequency of the clock-out signal is twice the frequency of the clock-in signal because for overall system timing purposes, it is desirable to supply composed pixel modulation data for the two lines that are obtained from one original line of pixel modulation data in the same time interval in which the original single line of pixel modulation data is normally supplied.

Line buffer 27 is also supplied a first line enable out signal and line buffer 29 is also supplied a second line enable out signal. These line enable out signals provide appropriate timing and gating for a read-type operation for line buffers 27 and 29. The first and second enable out intervals as determined by the values of the first and second line enable out signals are nowhere time coincident. Therefore, for example, during the enable out interval of the first line enable out signal, a signal representing the complete line of pixel modulation values that was previously stored in line buffer 27 is supplied to switching means 25 and ultimately to D/A converter 30 (FIG. 1). Also during the enable out interval of the first line enable out signal, appropriate lines of pixel modulation values from selector 28 are provided to line buffer 27 and 29 for storage. Likewise, for example, during the enable out interval of the second line enable out signal, a signal representing the complete line of pixel modulation values that was previously stored in line buffer 29 is supplied to switching means 25 and ultimately to D/A converter 30 while appropriate lines of pixel modulation values from selector 28 are provided to line buffer 27 and 29 for storage.

Figure 4A:
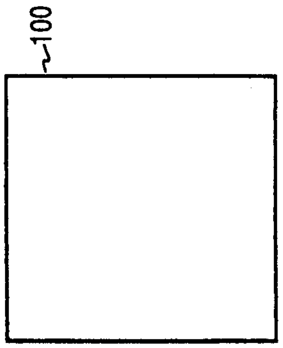
FIG. 4A is a schematic representation of a predetermined area of memory for describing a predetermined number of lines having a predetermined number of pixels per line.
Figure 4B:
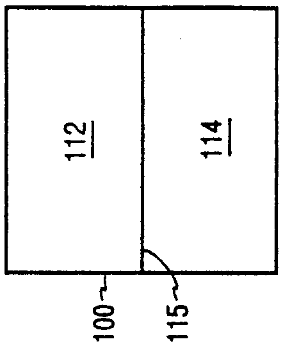
FIG. 4B shows the predetermined area of FIG. 4A divided horizontally in half so that each half represents one-half the number of lines and the same number of pixels per line as does the area of FIG. 4A.
Figure 4C:
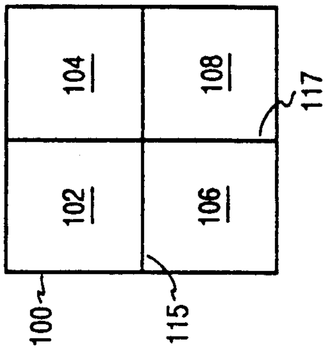
FIG. 4C shows the predetermined area of FIG. 4A divided in half both horizontally and vertically so that each quarter represents one-half the number of lines and one-half the number of pixels per line than the area as illustrated in FIG. 4A.

Referring to FIGS. 4A–4C, a schematic representation of predetermined area of memory and divisions, or partitions, thereof useful with the present invention are shown. FIG. 4A shows an area 100 of memory 10 that is representative of original pixel modulation data for a predetermined number of lines having a predetermined number of pixels per line, such as may be provided by a high resolution channel of an image generator. Two common line/pixel schemes are 1,023 lines having 1,000 pixels per line and 525 lines having 512 pixels per line that may be used with a light valve projector or CRT display. The actual number of lines and actual number of pixels per line are not significant for purposes of applying the present invention.

Shown in FIG. 4B, is area 100 of FIG. 4A divided by horizontal line 115 into equal area sectors 112 and 114. Each of area sectors 112 and 114 includes full original pixel modulation data for one-half the total number of lines of area 100 having the same number of pixels per line, thereby maintaining the same horizontal resolution as in area 100 of FIG. 4A. Pixel modulation data from each of area sectors 112 and 114 may be processed in accordance with the description of the present invention accompanying FIGS. 1-3 for obtaining respective pixel modulation data describing the same horizontal and vertical sized area as area 100. In effect, the original pixel modulation data for one higher resolution area 100 has been processed to obtain composed pixel modulation data for two areas that are the same size as area 100 and have the same number of lines and pixels per line as represented by the original pixel modulation data descriptors of area 100.

Processed pixel modulation data for area descriptors obtained from area sectors 112 and 114 may be conveniently used for background or peripheral image displays, since high resolution is generally not required for these applications. The resulting displayed video available from pixel modulation data obtained by processing pixel modulation data from a sector area, say 112, in accordance with the present invention is subjectively of higher quality and better resolution than that obtainable by simply taking the pixel modulation data for area sector 112 and attempting to spread it out without additional processing so that it covers twice the area.

Shown in FIG. 4C is area 100 of FIG. 4A divided by horizontal line 115 and vertical line 117 into equal area sectors 102, 104, 106 and 108. Each of area sectors 102, 104, 106 and 108 includes full original pixel modulation data for one-half the total lines of area 100 and one-half the number of pixels per line of area 100. The number of lines of each of area sectors 102, 104, 106 and 108 can be increased in accordance with the description of the present invention associated with FIGS. 1-3 so that images from each of area sectors 102, 104, 106 and 108 can be displayed on a display device having the same vertical resolution as would typically be used to display an image from area 100 of FIG. 4A. Images from area sectors 102, 104, 106 and 108 in accordance with the present invention generally have adequate resolution for representing side or peripheral displays, or background displays.

Figure 5:
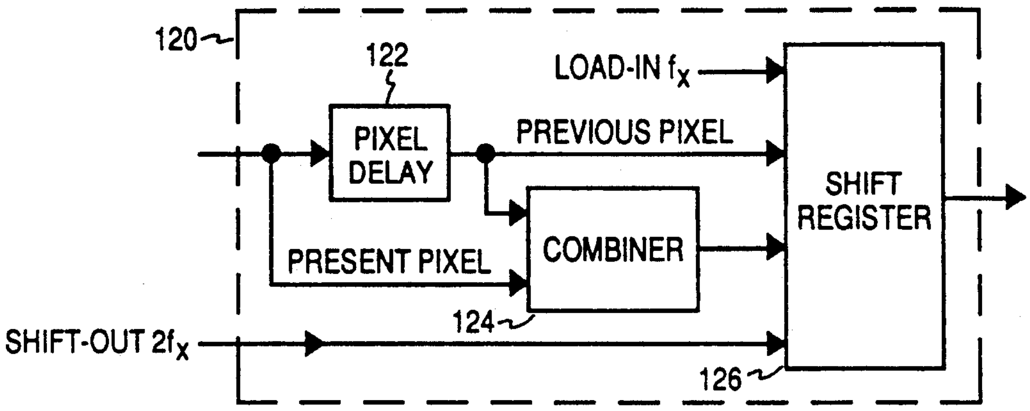
FIG. 5 is a block diagram of an extender circuit useful for increasing the number of pixels per line in accordance with the present invention.

In order further to enhance the image obtained from area sectors 102, 104, 106 and 108, horizontal (i.e. along a line) pixel modulation data manipulation and processing analogous to that used in the vertical direction as previously described herein may be use for increasing the effective number of pixels per line as is explained in conjunction with FIG. 5.

Referring to FIG. 5, a circuit useful for pixel modulation data manipulation and processing along a line in accordance with the present invention is shown. Extender circuit 120 includes a pixel delay circuit 122, a combiner circuit 124 and a shift register 126.

The input of pixel delay circuit 122, constituting the input of extender circuit 120, receives serial pixel modulation data. The serial pixel modulation data, designated as the present pixel modulation signal, is also provided to an input of combiner circuit 124. The output of pixel delay circuit 122, having the previous pixel modulation signal available thereat, is connected to an input of shift register 126 and to another input of combiner 124. The output of combiner 124, having available a signal representing a predetermined combination, such as average, of the present and previous pixel modulation signal values supplied to combiner 124 available thereat, is connected to another input of shift register 126. Shift register 126 selects the pixel modulation value available at one input or the other for transfer to its output. The output of shift register 126, which constitutes the output of extender circuit 120, has available the selected pixel modulation values for one line followed by the selected pixel modulation values for the next line of a field, or of a frame if a non-interlaced display is used. Shift register 126 also receives a load-in signal having a frequency $f_x$ and a shift-out signal having a frequency 2 $f_x$, that is, twice the frequency of the load-in signal.

For an explanation of the operation of extender circuit 120, assume that individual ones of a group of consecutive pixel modulation values along a line to be supplied to extender circuit 120 are sequentially identified as W, X, Y and Z. Pixel value W is presented to pixel delay circuitry 122 where it is delayed for one pixel interval. After the one pixel interval delay, pixel value W is available at the output of pixel delay 122, while pixel value X is provided to the input of pixel delay 122 and to the one input of combiner 124. The other input of combiner 124 has pixel value W supplied thereto from the output of pixel delay 122. The output of combiner 124 has available a signal designated (WX) that is a predetermined combination, as performed by combiner circuitry 124, of the pixel W and pixel X modulation values which are supplied to the inputs of combiner 124. Combiner circuitry 124 may conveniently be arranged to provide the average value of the sum of the pixel modulation values available at the inputs of combiner 124 in which case the symbol (WX) represents the average value of the sum of pixel modulation values W and X. Shift register 126 chooses signals available at its inputs so that the signal available at its output includes an original pixel modulation value followed by the same original pixel modulation value predeterminedly combined with the next original pixel modulation value followed by the same next original pixel modulation value. Using the pixel modulation value designators of the example, the output of selector 126 is represented by W, (WX), X, (XY), Y, (YZ), Z. The modulation values available at the output of shift register 126 constitute the output signal from shift register 126.

The input of extender circuitry 125 may be connected to the output of PALET processing circuitry 20 (FIG. 1) in which case the connection between the output of PALET circuitry 20 and D/A converter 30 (FIG. 1) is electrically interrupted and the output of extender circuitry 120 is connected to the input of D/A converter 30. It is of course possible that extender circuitry may be connected between the output of video memory 10 (FIG. 1) and the input of PALET processing circuitry 20, in which case processing along a line would be performed before processing between lines is performed.

Figure 6A:
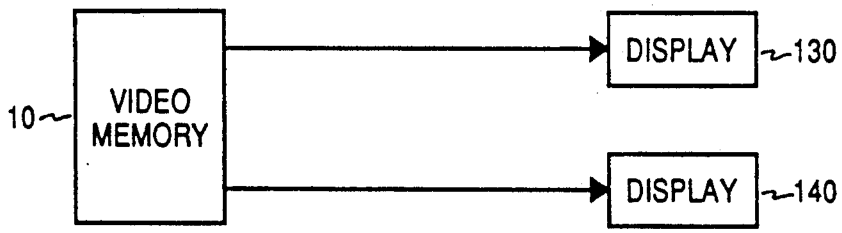
FIG. 6A (PRIOR ART)
FIG. 6A is a block diagram of a previously employed display scheme.

Referring to FIG. 6A, a block diagram of a previously employed display scheme is shown. Signals representing original full pixel modulation values from video memory 10 are ultimately supplied to displays 130 and 140. Each of displays 130 and 140 is typically of high resolution, say 1,023 lines having 1,000 pixels per line.

Figure 6B:
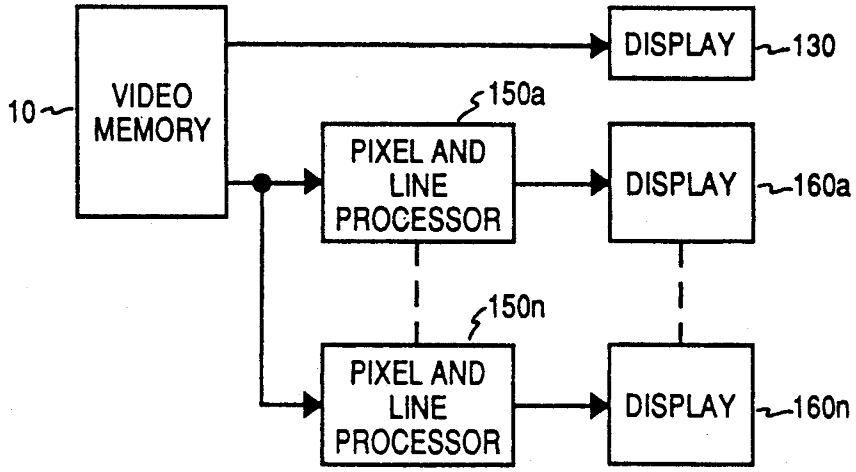
FIG. 6B is a block diagram of a display scheme in accordance with the present invention.

Referring to FIG. 6B, a block diagram of a display scheme in accordance with the present invention is shown. Video memory 10 may still provide pixel modulation values to display 130. However, pixel modulation data from video memory 10, that may have been previously used to supply display 140 (FIG. 6A), is partitioned or assigned into a predetermined plurality of sections so that each section may provide pixel modulation data to a respective display in accordance with the present invention.

Pixel modulation data from a partitioned section of memory 10 is supplied to an input of pixel and line processor circuitry 150a. Pixel and line processor circuitry 150a includes the appropriate configuration of PALET processing circuitry 20, D/A converter 30, low pass filter 40 and extender circuitry 120 as shown and described along with FIGS. 1 and 5. The output of pixel and line processor 150a is connected to an input of display 160a for supplying composed pixel modulation data thereto.

A plurality of pixel and line processors 150a–150n for supplying respective composed modulation data to a respective plurality of displays 160a–160n may be provided. Each of the plurality of pixel and line processors 150a–150n are connected to memory 10 for receiving original pixel modulation data from a respective predetermined partition of memory 10. Thus, original pixel modulation data from memory 10, which may have been dedicated to single display 140 (FIG. 6A), is able to support a plurality of displays 150a–150n in accordance with the present invention. Of course, if desired, the original pixel modulation data that supplies display 130 may be analogously partitioned into a plurality of sections for ultimately providing composed pixel modulation data to another respective plurality of displays.

Thus has been illustrated and described a computer image generation system wherein the image generation system produces data for one display system having a predetermined resolution and further wherein a pixel modulation processing system produces data for a plurality of displays having the predetermined resolution from the data for the one display. Further described and shown is a method for deriving data for one or a plurality of high resolution displays from a predetermined portion of data for a full high resolution display and for deriving data for a plurality of displays having a predetermined resolution from data for one display having the predetermined resolution.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a computer image generation system, apparatus for determining composed pixel modulation data having pixel modulation values for a first predetermined number of lines for a display from pixel modulation information having pixel modulation values for a second predetermined number of lines for a second display, wherein the second predetermined number of lines is less than the first predetermined number of lines, the apparatus comprising:

combiner means for predeterminedly combining individual pixel modulation values of the pixel modulation information for generating derived pixel modulation data having derived pixel modulation values; and selector means coupled to the combiner means for receiving the derived pixel modulation data and further coupled for receiving the pixel modulation information, the selector means for predeterminedly selecting pixel modulation values from the derived pixel modulation data and from the pixel modulation information for supplying the composed pixel modulation data such that each line of the composed pixel modulation data includes at least one pixel modulation value selected from the derived pixel modulation data and from the pixel modulation information.

2. The apparatus as in claim 1, wherein the derived pixel modulation data is an average of corresponding pixel modulation values from adjacent lines of the pixel modulation information.

3. The apparatus as in claim 1, wherein the composed pixel modulation data includes twice as many lines as the second predetermined number of lines.

4. The apparatus as in claim 3, wherein a line of the composed pixel modulation data includes alternating pixel modulation values selected from the derived pixel modulation data and from the pixel modulation information.

5. The apparatus as in claim 4, wherein the derived pixel modulation data and the pixel modulation information of adjacent lines of composed pixel modulation data are offset with respect to each other for forming a checkerboard-like pattern when supplied to pixels of the second display.

6. The apparatus as in claim 1, further comprising:

line memory means for storing pixel modulation information for a first predetermined line of the display, the line memory means having an input for receiving the pixel modulation information and an output coupled to an input of the combiner means and selector means for supplying pixel modulation information from the first predetermined line for the display, the selector means further coupled for receiving pixel modulation information for a second predetermined line of the display, and the selector means also for supplying the compound pixel modulation data, the composed pixel modulation data including a first predetermined sequence of pixel modulation values selected from the first and second predetermined line for the display and from the derived pixel modulation data.

7. The apparatus as in claim 6, wherein the first and second predetermined lines are adjacent lines for a same frame of the display.

8. The apparatus as in claim 6, wherein the first and second predetermined lines are adjacent lines for a same field of the display.

9. In a computer image generation system, a method for determining composed pixel modulation data for a visual display from original pixel modulation information having original pixel modulation values, the original pixel modulation information for defining a first predetermined number of lines of a video presentation, comprising:

combining predetermined original pixel modulation values for forming derived pixel modulation data having derived pixel modulation values; and selecting original and derived pixel modulation values for forming the composed pixel modulation data, the composed pixel modulation data for defining a second predetermined number of lines for the visual display, wherein the second number of lines is greater than the first number of lines and further wherein each line of the composed pixel modulation data includes at least one pixel modulation value from the original pixel modulation data and from the derived pixel modulation data.

10. The method as in claim 9, wherein the step of combining includes averaging predetermined ones of original pixel modulation values of a line with corresponding original pixel modulation values of an adjacent line of the original pixel modulation information for forming average pixel modulation values, wherein the resulting average pixel modulation values constitute the derived pixel modulation data.

11. The method as in claim 10, wherein the step of combining includes averaging adjacent pixel modulation values along a line for forming a resulting average value and supplying the resulting average value as a pixel modulation value between the adjacent pixel modulation values used to determine the resulting average value.

12. The method as in claim 10, wherein the step of selecting includes selecting first derived pixel modulation values and first original pixel modulation values so that the selected first derived and first original pixel modulation values alternate along a first line of the compound pixel modulation data.

13. The method as in claim 9, wherein the second predetermined number of lines is twice the first predetermined number of lines.

14. The method as in claim 9, wherein a line and an adjacent line of original pixel modulation information are respectively for one field and another field of a frame for the visual display and further wherein the step of combining includes:

oversampling along the line of the original pixel modulation data, the oversampling performed between the line and the adjacent line of the another field for determining oversampled pixel modulation values for the line along which the oversampling is performed; and combining predetermined ones of oversampled pixel modulation values of the line with corresponding oversampled pixel modulation values of an adjacent line of the one field of the frame for forming a resulting combined oversampled pixel modulation value, wherein the resulting combined oversampled pixel modulation values constitute the derived pixel modulation data.

15. In a computer image generation system, a method for determining composed pixel modulation data for a visual display from original pixel modulation information having original pixel modulation values, the original pixel modulation information for defining a first predetermined number of lines of a video presentation, comprising:

combining predetermined original pixel modulation values for forming derived pixel modulation data having derived pixel modulation values; and selecting original and derived pixel modulation values for forming the composed pixel modulation data, the composed pixel modulation data for defining a second predetermined number of lines for the visual display, wherein the second number of lines is greater than the first number of lines and further wherein each line of the composed pixel modulation data includes at least one pixel modulation value from the original pixel modulation data and from the derived pixel modulation data, wherein a line and an adjacent line of original pixel modulation values are respectively for one field and another field of a frame for the visual display and further wherein the step of combining includes:

oversampling along the line of the original pixel modulation data, the oversampling performed between data from the line and the adjacent line of the another field for determining oversampled pixel modulation values for the line along which the oversampling is performed; and averaging predetermined ones of oversampled pixel modulation values of the line with corresponding oversampled pixel modulation values of an adjacent line of the one field of the frame, wherein the resulting average oversampled pixel modulation values constitute the derived pixel modulation data.

16. In a computer image generation system, a method for determining composed pixel modulation data for a visual display from original pixel modulation information having original pixel modulation values, the original pixel modulation information for defining a first predetermined number of lines of a video presentation, comprising:

combining predetermined original pixel modulation values for forming derived pixel modulation data having derived pixel modulation values; and selecting original and derived pixel modulation values for forming the composed pixel modulation data, the composed pixel modulation data for defining a second predetermined number of lines for the visual display, wherein the second number of lines is greater than the first number of lines and further wherein each line of the composed pixel modulation data includes at least one pixel modulation value from the original pixel modulation data and from the derived pixel modulation data, wherein the step of combining includes averaging predetermined ones of original pixel modulation values of a line with corresponding original pixel modulation values of an adjacent line of the original pixel modulation data, wherein the resulting average pixel modulation values constitute the derived pixel modulation data, and further wherein the step of selecting includes selecting first derived pixel modulation values and first original pixel modulation values so that the selected first derived and first original pixel modulation values alternate along a first line of the composed pixel modulation data, yet further wherein the step of selecting further includes:

selecting second derived pixel modulation values and second original pixel modulation values so that the selected second derived and second original pixel modulation values alternate along a second line of the composed pixel modulation data, wherein the first and second lines are adjacent lines; and arranging the selected first and second derived pixel modulation values so that the selected first and second derived pixel modulation values are offset with respect to each other for forming a checkerboard-like pattern when supplied to pixels of the visual display.

17. In a computer image generation system, a method for determining a respective set of composed pixel modulation image data for defining a respective first predetermined number of lines for respective ones of a plurality of displays, wherein each set of composed image data is obtained from a set of original pixel modulation image data for a single display having a second predetermined number of lines, comprising:

assigning a respective predetermined portion of the set of original image data for each of the plurality of displays;

predeterminedly combining image data within each portion of the set of original image data for forming a respective set of derived pixel modulation data; and selecting respective derived pixel modulation data and respective original pixel modulation image data from the respective portion of the set of original data for designating the respective set of composed data, wherein the respective set of composed data defining a greater number of lines than are defined by the respective portion of the set of original data, and lines defined by each respective set of composed data including at least one pixel modulation value selected from the respective original modulation image data and from the respective derived pixel modulation data.

18. The method as in claim 17, wherein the step of selecting further includes selecting so that derived data and original image data alternate along a line of composed image data.

19. The method as in claim 16, wherein the step of selecting further includes selecting so that the number of lines defined by the composed image data is twice the number of lines defined by the respective portion of the original image data.

20. The method as in claim 19, wherein the number of lines of the single display is the same as the respective first predetermined number of lines.

21. The method as in claim 18, wherein the step of selecting further includes selecting such that the derived data and the original image data of adjacent lines of composed pixel modulation data are offset with respect to each other for forming a checkerboard-like pattern when supplied to pixels of respective ones of the plurality of displays.

22. In a computer image generation system, a method for determining a respective set of composed pixel modulation image data for defining a respective plurality of lines for respective ones of a plurality of displays, wherein each set of composed image data is obtained from a set of original pixel modulation image data for a single display, comprising:

assigning a respective predetermined portion of the set of original image data for each of the plurality of displays;

predeterminedly combining image data within each portion of the set of original image data for forming a respective set of derived pixel modulation data; and selecting respective derived pixel modulation data and respective original pixel modulation image data from the respective portion of the set of original data for designating the respective set of composed data, wherein the respective set of composed data defining a greater number of lines than defined by the respective portion of the set of original data and lines defined by each respective set of composed data including at least one pixel modulation value selected from the respective original modulation image data and from the respective derived pixel modulation data, wherein the step of selecting further includes selecting so that derived data and original image data alternate along a line of composed image data and the number of lines in the composed image data is twice the number of lines in the respective portion of the original image data wherein the step of combining includes oversampling between data from respective adjacent lines of the original image data for obtaining respective oversampled pixel modulation data wherein the oversampled pixel modulation data is predeterminedly combined for forming the respective set of derived pixel modulation data.

23. The method as in claim 22, wherein the respective set of original pixel modulation data defines data for two interlaced fields of a frame and further wherein the respective adjacent lines are adjacent lines of a same field.

* * * * *